(12) United States Patent
Sadafale

(10) Patent No.: US 9,025,675 B2
(45) Date of Patent: May 5, 2015

(54) SYSTEMS AND METHODS FOR REDUCING BLOCKING ARTIFACTS

(75) Inventor: Mangesh Devidas Sadafale, Nagpur (IN)

(73) Assignee: Texas Instruments Incorporated, Dallas, TX (US)

( * ) Notice: Subject to any disclaimer, the term of this patent is extended or adjusted under 35 U.S.C. 154(b) by 434 days.

(21) Appl. No.: 13/529,145

(22) Filed: Jun. 21, 2012

(65) Prior Publication Data

US 2012/0328029 A1    Dec. 27, 2012

(30) Foreign Application Priority Data

Jun. 22, 2011    (IN) .......................... 2121/CHE/2011

(51) Int. Cl.
*H04N 7/12*      (2006.01)
*H04N 19/86*     (2014.01)
*H04N 19/176*    (2014.01)
*H04N 19/134*    (2014.01)
*H04N 19/117*    (2014.01)
*H04N 19/186*    (2014.01)

(52) U.S. Cl.
CPC ............. *H04N 19/86* (2014.11); *H04N 19/176* (2014.11); *H04N 19/134* (2014.11); *H04N 19/117* (2014.11); *H04N 19/186* (2014.11)

(58) Field of Classification Search
USPC ...................................... 375/240.29
See application file for complete search history.

(56) References Cited

U.S. PATENT DOCUMENTS

| | | | |
|---|---|---|---|
| 2006/0078055 A1* | 4/2006 | Kanazawa | ............... 375/240.27 |
| 2006/0126962 A1* | 6/2006 | Sun | ................. 382/268 |
| 2008/0069247 A1* | 3/2008 | He | ............ 375/240.29 |
| 2011/0274158 A1* | 11/2011 | Fu et al. | ................... 375/240.02 |

* cited by examiner

*Primary Examiner* — Tracy Li
(74) *Attorney, Agent, or Firm* — Mirna Abyad; Frank D. Cimino

(57) ABSTRACT

Several systems, methods and integrated circuits capable of reducing blocking artifacts in video data are disclosed. In an embodiment, a system for reducing blocking artifacts in video data includes a processing module and a deblocking module. The deblocking module comprises a luma deblocking filter and a chroma deblocking filter configured to filter an edge between adjacent blocks associated with the video data, where a block of the adjacent blocks corresponds to one of a prediction block and a transform block. The processing module is communicatively associated with the deblocking module and is operable to configure at least one filter coefficient corresponding to the chroma deblocking filter based on one or more filter coefficients corresponding to the luma deblocking filter. The processing module is further configured to cause the chroma deblocking filter to filter the edge between the adjacent blocks based on the configured at least one filter coefficient.

17 Claims, 5 Drawing Sheets

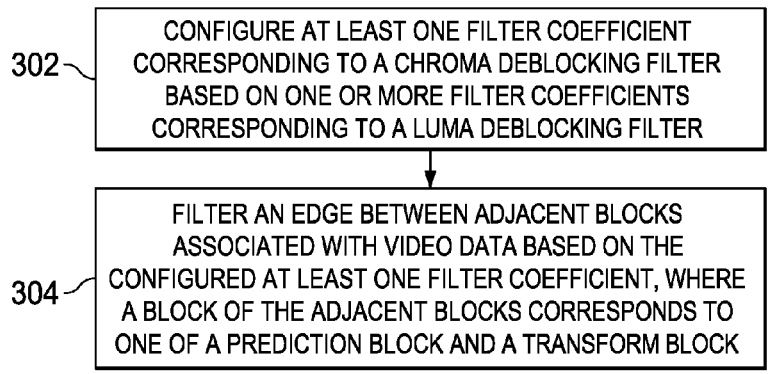

FIG. 3

302 — CONFIGURE AT LEAST ONE FILTER COEFFICIENT CORRESPONDING TO A CHROMA DEBLOCKING FILTER BASED ON ONE OR MORE FILTER COEFFICIENTS CORRESPONDING TO A LUMA DEBLOCKING FILTER

304 — FILTER AN EDGE BETWEEN ADJACENT BLOCKS ASSOCIATED WITH VIDEO DATA BASED ON THE CONFIGURED AT LEAST ONE FILTER COEFFICIENT, WHERE A BLOCK OF THE ADJACENT BLOCKS CORRESPONDS TO ONE OF A PREDICTION BLOCK AND A TRANSFORM BLOCK

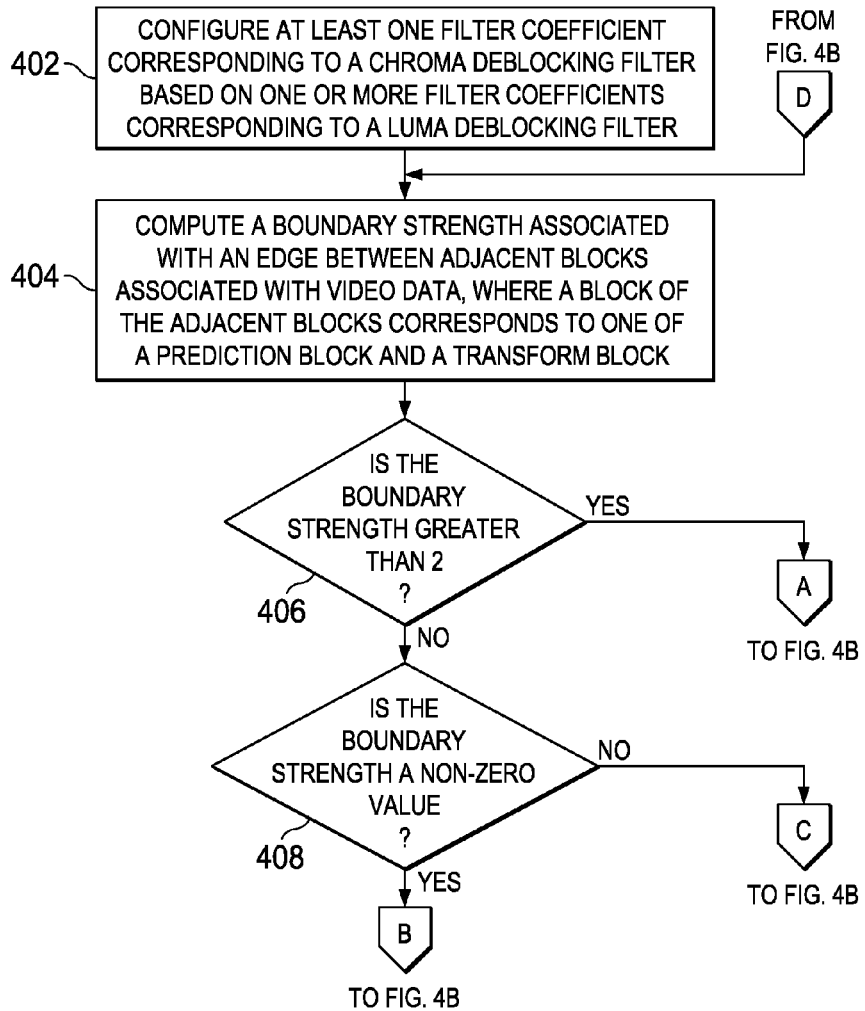

FIG. 4A

SYSTEMS AND METHODS FOR REDUCING BLOCKING ARTIFACTS

CROSS REFERENCE TO RELATED APPLICATIONS

This application claims the benefit of provisional patent application number 2121/CHE/2011, filed on Jun. 22, 2011, in the Indian Patent Office, which is incorporated herein by reference in its entirety.

TECHNICAL FIELD

The present disclosure generally relates to the field of filtering video data.

BACKGROUND

Pursuant to an exemplary scenario, video data captured by media capture devices, such as, for example, a camera or a camcorder, may be compressed in order to save memory during storage or to efficiently utilize the available bandwidth during a transmission. The video data may be encoded utilizing encoding mechanisms that are sufficient to achieve compression of the video data. The video data may subsequently be decompressed (for example, decoded) for display/viewing purposes.

Moreover, in an exemplary scenario, various video coding paradigms suggest a block-based coding of video data, where each frame of video data is represented in terms of a plurality of blocks, and where coding techniques such as motion compensation and transformation are applied to the blocks so as to remove temporal and spatial redundancies in the frames corresponding to the video data. Pursuant to one exemplary scenario, visual distortions in content may sometimes be observed when viewing content corresponding to video data is subjected to block-based coding. As a result of block-based coding of video data, a transition of content from one block to another may sometimes be affected, especially near edges of the blocks resulting in visual distortions. Such visual distortions, which may also be referred to, for example, as blocking artifacts, may reduce a perceptual quality of content corresponding to the video data.

SUMMARY

Various systems, methods, and integrated circuits for reducing blocking artifacts in video data are disclosed. In an embodiment, a system for reducing blocking artifacts in video data is provided. The system includes a processing module and a deblocking module. The deblocking module comprises a luma deblocking filter and a chroma deblocking filter configured to filter an edge between adjacent blocks associated with video data, where a block of the adjacent blocks corresponds to one of a prediction block and a transform block. The processing module is communicatively associated with the deblocking module. The processing module is operable to configure at least one filter coefficient corresponding to the chroma deblocking filter based on one or more filter coefficients corresponding to the luma deblocking filter. The filter coefficient of the at least one filter coefficient corresponds to a coefficient associated with a parameter, and a parametric value associated with the parameter is configured to be combined with a pixel value corresponding to a pixel associated with a block of the adjacent blocks of video data. The processing module is configured to cause the chroma deblocking filter to filter the edge based on the at least one filter coefficient.

Additionally, in an embodiment, a method for reducing blocking artifacts in video data is provided. The method includes configuring at least one filter coefficient corresponding to a chroma deblocking filter based on one or more filter coefficients corresponding to a luma deblocking filter. The method also includes filtering an edge between adjacent blocks associated with video data, based on the configured at least one filter coefficient, where a block of the adjacent blocks corresponds to one of a prediction block and a transform block. In an embodiment, a boundary strength associated with the edge is computed. The boundary strength is a numerical value computed based on at least one of an encoding mode of the adjacent blocks associated with the edge and an encoding data associated with the adjacent blocks. In an embodiment, the edge is filtered by the chroma deblocking filter based on the at least one filter coefficient on determining the boundary strength to be greater than a predetermined value.

In an embodiment, it is determined whether the adjacent blocks are associated with blocking artifacts based on a predefined criterion on determining the boundary strength to be less than or equal to the predetermined value. In an embodiment, the edge is filtered by the chroma deblocking filter based on the at least one filter coefficient on determining the adjacent blocks to be associated with the blocking artifacts and the boundary strength to be non-zero value.

Moreover, in an embodiment, an integrated circuit configured to reduce blocking artifacts in video data is provided. The integrated circuit includes a coding module and a memory module. The coding module is configured to perform at least one of encoding of video data and decoding of encoded video data. The memory module is communicatively associated with the coding module and is configured to store the video data subsequent to one of an encoding of video data and a decoding of video data. The coding module includes a deblocking module and a processing module. The deblocking module includes a luma deblocking filter and a chroma deblocking filter configured to filter an edge between adjacent blocks associated with the video data, where a block of the adjacent blocks corresponds to one of a prediction block and a transform block. The processing module is communicatively associated with the deblocking module, wherein the processing module is operable to configure at least one filter coefficient corresponding to the chroma deblocking filter based on one or more filter coefficients corresponding to the luma deblocking filter. The processing module is configured to cause the chroma deblocking filter to filter the edge based on the at least one filter coefficient.

BRIEF DESCRIPTION OF THE FIGURES

FIG. 3 is a flow diagram of an exemplary method for reducing blocking artifacts in video data in accordance with an embodiment;

FIGS. 4A-4B collectively show a flow diagram of an exemplary method for reducing blocking artifacts in video data by filtering an edge between adjacent blocks associated with video data in accordance with an embodiment.

DETAILED DESCRIPTION

In an exemplary scenario, various video coding paradigms suggest a block-based coding of video data, where each frame of video data is represented in terms of a plurality of blocks. Further, coding techniques such as motion compensation and transformation are applied to the blocks so as to remove temporal and spatial redundancies in the frames corresponding to the video data. Pursuant to an exemplary scenario, visual distortions in content may sometimes be observed when viewing content corresponding to video data is subjected to block-based coding. As a result of block-based coding of video data, a transition of content from one block to another may sometimes be affected, especially near edges of the blocks resulting in visual distortions. Such visual distortions, which may also be referred to as, for example, blocking artifacts, may reduce a perceptual quality of content corresponding to the video data. In order to reduce the occurrence of the blocking artifacts, deblocking filters may be employed during the encoding and decoding processes. The deblocking filters may be applied to edges between adjacent blocks in order to reduce the blocking artifacts without reducing the sharpness of the video data, which results in an improvement of the subjective quality of the video data.

The deblocking filter may be applied separately for the luminance and chrominance components associated with the video data. Also, the deblocking filters may be applied to vertical and/or horizontal edges associated with the blocks of the video data. The application of deblocking filters during the encoding and decoding processes is explained herein with reference to FIGS. 1A and 1B.

Figure 1A:
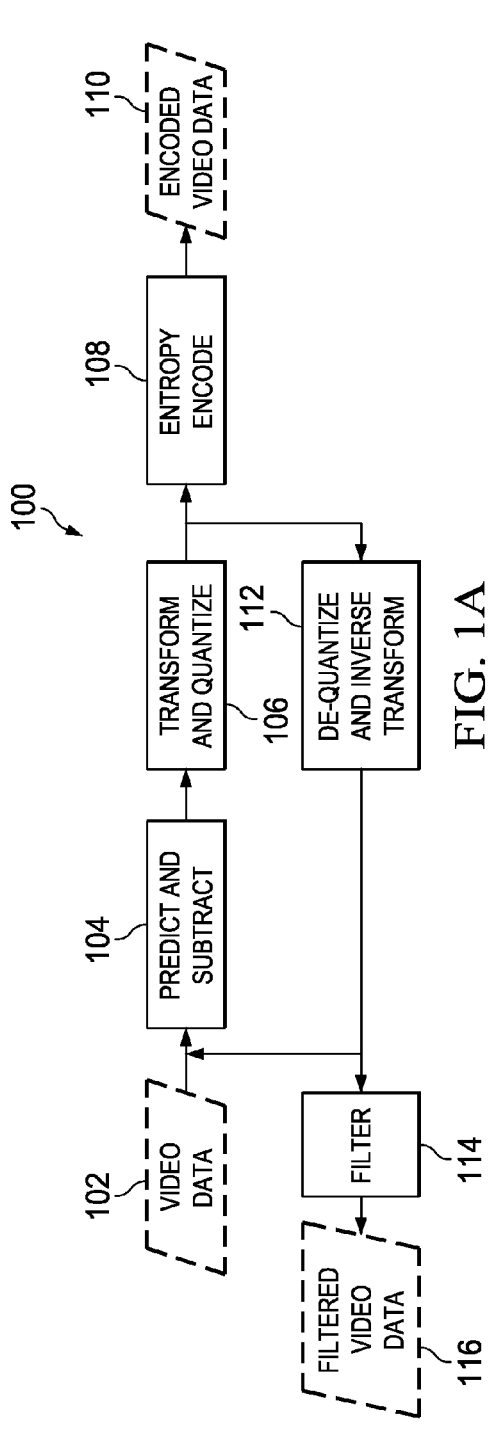
FIGS. 1A and 1B illustrate simplified overviews of exemplary processes for encoding and decoding video data in accordance with an exemplary scenario.
Figure 1B:
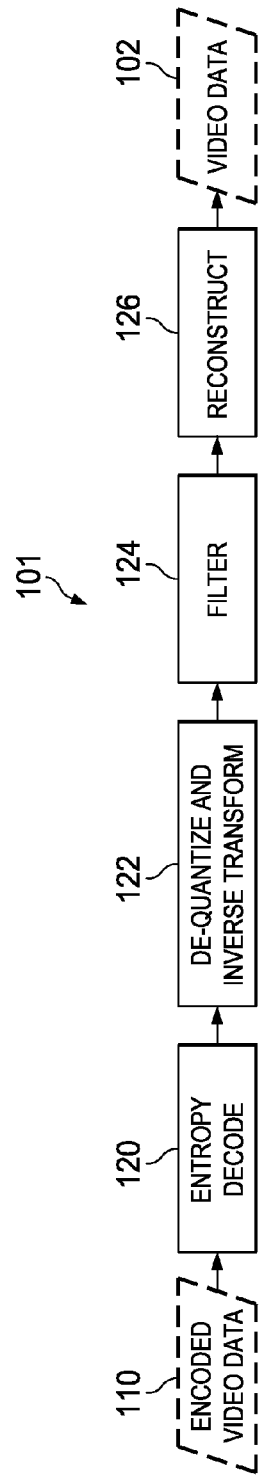

FIGS. 1A and 1B illustrate simplified overviews of exemplary processes for encoding and decoding multimedia data (for example, video data 102), respectively, in accordance with an exemplary scenario. In particular, FIG. 1A illustrates a simplified overview of an encoding process flow 100 for encoding video data 102. Pursuant to an exemplary scenario, a video encoder may perform the encoding process flow 100 in order to achieve the compression of the video data 102. The video data 102 may be compressed so as to efficiently utilize a storage capacity during storage or a spectrum/bandwidth during a transmission.

The video encoder may be configured within a multimedia system. Examples of the multimedia system may include, but are not limited to: (1) multimedia devices, such as, for example, cellular phones, digital video cameras and digital camcorders; (2) data processing devices, such as, for example, personal computers, laptops and personal digital assistants; and (3) consumer electronics, such as, for example, set top boxes, digital video disk (DVD) players and video network servers. Pursuant to an exemplary scenario, the video encoder may be any machine capable of executing a set of instructions (sequential and/or otherwise) so as to perform an encoding of video data 102.

The video data 102 may be received by the video encoder from a media capture device. Examples of a media capture device may include a video camera or a camcorder. The video capture device may be, for example, a stand-alone device or a part of a mobile device, such as, for example, a Smartphone, or a data processing device, such as, for example, a personal computer, a laptop device or a personal digital assistant (PDA). The video data 102 may also be received by the video encoder from a transcoding system (which may be implemented, for example, in any of hardware, software and/or firmware), which may be a stand-alone device or a part of the video capture device.

Pursuant to an exemplary scenario, the video data 102 may include a sequence of video frames, and each frame from among the sequence of frames may include a plurality of blocks (for example, macro blocks) of video data 102. At 104 of the encoding process flow 100, a prediction for each block from among the plurality of blocks of video data 102 is determined and subtracted from a reference block in order to form residual data. The prediction for each block of video data 102 may be performed based on previously encoded blocks of video data 102, either from a current frame (for example, intra prediction) or from other frames that have already been encoded and transmitted (for example, inter prediction). Identifying a suitable inter-prediction may be referred to, for example, as motion estimation, and subtracting the inter-prediction from the current block may be referred to, for example, as motion compensation.

After prediction and subtraction, at 106, the residual data is transformed and quantized. The transformation of the residual data outputs a set of transform coefficients, each of which is a weighting value for a preselected basis pattern. The weighted basis patterns, when combined, are capable of recreating the residual data. The set of transform coefficients are then quantized (such as where each coefficient is scaled according to a scale-down factor, which may be a mathematical reciprocal of the scale-up factor specified by a video coding paradigm, effectively setting a number of transform coefficients to a small value (including zero value) so as to achieve a compression.

The quantized transform coefficients, along with certain information (such as, for example, information pertaining to the structure of compressed video data, information about a complete sequence of video data 102 and/or information that enables a decoder to re-create the prediction), are subject to entropy encoding (for example, conversion into binary codes using variable length coding and/or arithmetic coding) at 108. The entropy encoding of the video data 102 produces an efficient, compact binary representation of the information in the form of encoded video data 110.

The encoding process flow 100 further involves a reverse path for enabling a prediction/subtraction for subsequent blocks of video data 102. The reverse path includes de-quantization of the quantized video data and inverse transformation of de-quantized video data. At 112, the quantized transform coefficients may be de-quantized (for example, scaled corresponding to a scale-up factor, which may be, in an exemplary embodiment, a value specified by a video paradigm) and then inversely transformed in order to obtain the inversely transformed video data. The inversely transformed video data may be obtained in the form of residual samples. The residual samples may be provided for prediction/subtraction so as to enable a prediction of subsequent blocks of video data 102. At 114, the residual data is subjected to filtering, such as, for example, by using a deblocking filter prior to being reconstructed for obtaining filtered video data 116. In some embodiments, the residual data is subjected to filtering so as to reduce distortion effects that may be observed in displayed video data as a result of block-based coding of video data 102. During filtering, a plurality of pixels at various edges of the blocks are modified, thereby causing a smoothening of pixel-value transition from one block to another, and thereby reducing visual distortions, such as, for example, blocking artifacts. It is noted that the video compression paradigms may specify the implementation of decoding process in a video decoder, which may be replicated for the video encoder.

FIG. 1B illustrates a simplified overview of a decoding process flow 101 for decoding encoded video data 110. Pursuant to an exemplary scenario, a video decoder may perform the decoding process flow 101 in order to achieve the decompression of the video data 102. The video decoder may be configured within a multimedia system, such as, for example, the multimedia system of FIG. 1A. At 120, the encoded video data 110 may be entropy decoded (for example, converted from the binary form, first into intermediate symbols and thereafter into quantized transform coefficients along with the decoding of other encoded information). At 122, the quantized transform coefficients may be de-quantized (for example, scaled according to a scale-up factor, which may be, in an exemplary embodiment, a value specified by a video processing paradigm) and then inversely transformed to obtain the residual data. At 124, the residual data may be subjected to filtering so as to reduce blocking artifacts prior to being reconstructed and displayed. During filtering, a plurality of pixels near the various edges of the blocks may be modified in order to smooth the transition of content from one block to another. The residual data may be subjected to filtering through a deblocking filter in order to obtain filtered video data. At 126, blocks corresponding to the filtered video data may then be reconstructed to generate video data 102, which may then be displayed for viewing purposes.

In an embodiment, the process flows 100 and 101 outlined in FIGS. 1A and 1B form the core of video encoder and decoder systems, respectively. It should be noted that various exemplary video coding paradigms might provide specifications for the implementation of the process flow for decoding, such as, for example, the process flow 101. However, the implementation of the process flow for encoding, such as, for example, the process flow 100, though not specified by various multimedia paradigms, may be constructed by inversely mirroring the process flow for decoding, such as that outlined by process flow 101 in FIG. 1B.

In an embodiment, during the filtering stages 114 of FIG. 1A and 124 of FIG. 1B, one or more edges associated with a plurality of blocks of the video data 102 are subjected to filtering through a deblocking filter. The deblocking filtering may include elements for performing filtering of luminance components (hereinafter referred to as luma components) and chrominance components (hereinafter referred to as chroma components) associated with the blocks and the filtering may be performed along the left, top, right and bottom edges associated with each of the blocks. The elements in the deblocking filter associated with filtering luma components are hereinafter referred to as a luma deblocking filter, and, the elements in the deblocking filter associated with filtering chroma components are hereinafter referred to as a chroma deblocking filter.

The filtering of luma components by the luma deblocking filter may include one or more filtering modes, such as, for example, strong filtering modes and weak filtering modes. The strong filtering modes for filtering luma components may be applied when a higher degree of pixel value variations is observed across edges of blocks of video data with no corresponding change in a scene corresponding to the blocks. Pixel values corresponding to a plurality of pixels on both sides of an edge may be modified, during filtering, in order to smooth the pixel value variations across the edge. The weak filtering modes for filtering luma components may be applied when a lower degree of pixel value variations is observed across edges corresponding to the video data. In such scenarios, a relatively small number of pixel values on either side of the edge are modified during a filtering of the edge.

It is noted that the chroma deblocking filters are weaker (for example, they may include lower filter-taps), and with highly quantized coefficients, when compared to the luma deblocking filters. Moreover, as a result of highly quantized coefficients, a chroma deblocking filter is associated with significantly lower precision as compared to a luma deblocking filter. Additionally, a configuration of a chroma deblocking filter lacks a degree of commonality with the configuration of a luma deblocking filter, thereby resulting in additional logic/area in hardware that is to be used to implement the deblocking filters. Moreover, the chroma deblocking filter is configured to be selectively applied merely to edges corresponding to adjacent blocks of video data, with at least one of the two adjacent blocks being intra-coded.

Various embodiments of the present technology, however, provide methods, systems, and integrated circuits that are configured to reduce blocking artifacts in video data and that are capable of overcoming these and other obstacles and providing additional benefits. The methods, systems and integrated circuits provide a chroma deblocking filter configured with filter coefficients, which have considerable commonality with the filter coefficients associated with the luma deblocking filter. Furthermore, an exemplary application of the chroma deblocking filter to edges between inter-coded adjacent blocks of video data is also explored. An exemplary system for reducing blocking artifacts in video data is described herein with reference to FIG. 2A.

Figure 2A:
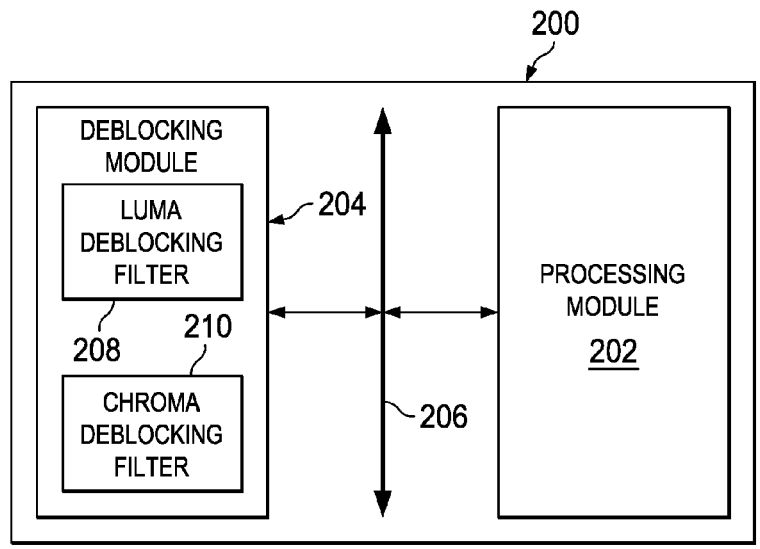
FIG. 2A is a block diagram of an exemplary system for reducing blocking artifacts in video data in accordance with an embodiment.

FIG. 2A is a block diagram of an exemplary system 200 configured to reduce blocking artifacts in video data, such as, for example, video data 102, in accordance with an embodiment. In an embodiment, the system 200 is configured to be included within a video encoder/decoder. For example, the system 200 may be one of a high efficiency video coding (HEVC) based decoder, a moving picture experts group (MPEG)-4 based decoder, a HEVC based encoder and a MPEG-4 based encoder. Alternatively, in an embodiment, the system 200 may be communicatively associated or coupled with a video encoder/decoder such that unfiltered video data may be received from the video encoder/decoder and filtered video data may be provided to the video encoder/decoder. The video data may include, for example, frames, fields and/or pictures associated with a video content. In an exemplary embodiment, the system 200 may be configured within a personal computer (PC), a tablet PC, a PDA, a mobile communication device, a web appliance, a set-top box (STB), an embedded system and/or any machine capable of executing a set of instructions (sequential and/or otherwise) so as to perform a filtering in order to reduce blocking artifacts in video data.

In an embodiment, the system 200 includes a processing module 202 and a deblocking module 204. In an embodiment, the processing module 202 and the deblocking module 204 are configured to communicate with each other via or through a bus 206. Examples of the bus 206 may include, but are not limited to, a data bus, an address bus, a control bus, and the like. The bus 206 may be, for example, a serial bus, a bi-directional bus or a unidirectional bus. In an embodiment, the deblocking module 204 is configured to include a luma deblocking filter 208 and a chroma deblocking filter 210 configured to filter edges between adjacent blocks associated with the video data. In an example embodiment, a block of the adjacent blocks corresponds to one of a prediction block and a transform block. The edge may be formed by a boundary between a prediction block and a transform block, between a pair of adjacent prediction blocks or between a pair of adjacent transform blocks. In an embodiment, the prediction blocks may include 16*16 blocks associated with video data and the transform blocks may include 32*32 blocks associated with video data. It is noted that the prediction block and the transform block may be basic units of prediction and transformation, respectively, as per one or more video coding paradigms including, for example, H.264 coding paradigm, HEVC paradigm, and the like. For example, the prediction blocks may include prediction units and the transform blocks may include transform units, where the prediction units and the transform units are defined as per the HEVC paradigm.

In an embodiment, the prediction units and the transform units may be a part of a coding unit of the HEVC paradigm. It is noted that the term 'coding unit' may be construed as referring to a basic unit of compression in the HEVC paradigm and is broadly analogous to the concept of macro block in the H.264 coding paradigm but is comparatively more flexible in terms of variable size. In the HEVC paradigm, the size of the coding units may be of the order of, for example, 32×32, or 64×64. Each coding unit may include multiple prediction units and/or transform units. A transform unit may include one or more prediction units. Alternatively, a prediction unit may include one or more transform units. In addition to 4×4 and 8×8 transforms, 16×16, 32×32, 32×16, 16×32, 16×8 and 8×16 transforms may be supported by transform units of the HEVC paradigm.

As explained herein with reference to FIG. 1B, the luma deblocking filter 208 may be configured to filter luma components corresponding to the edges and the chroma deblocking filter 210 may be configured to filter chroma components corresponding to the edges. In an embodiment, filtering the edge may involve modifying pixel values of pixels on one side or either side of the edge in order to smooth out a difference in pixel values so as to reduce the occurrence of blocking artifacts (for example, visual distortions in displayed video data). An exemplary edge between adjacent blocks is illustrated in FIG. 2B.

Figure 2B:
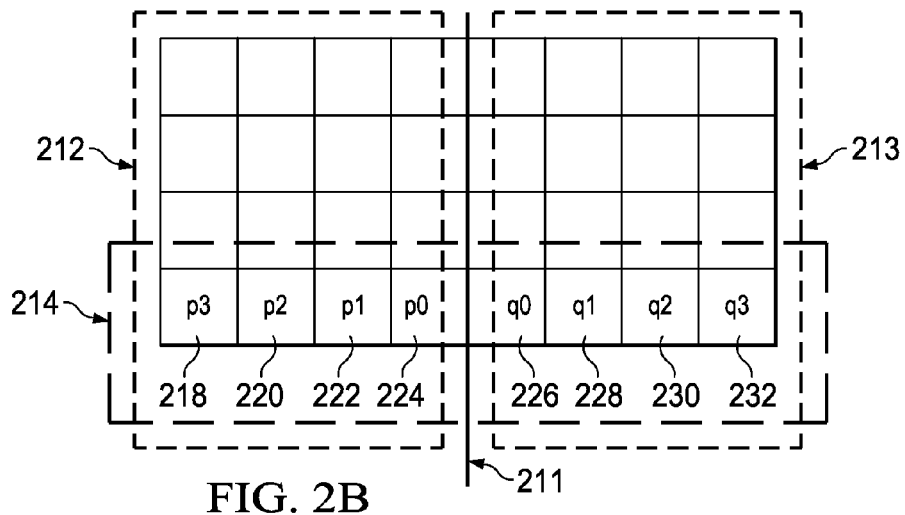
FIG. 2B illustrates an exemplary edge between adjacent blocks associated with video data in accordance with an embodiment.

FIG. 2B illustrates an exemplary edge 211 between adjacent blocks associated with video data in accordance with an embodiment. The adjacent blocks include a first block 212 and a second block 213. In an embodiment, each of the first block 212 and the second block 213 may be one of a prediction block and a transform block. More specifically, the adjacent blocks may represent a prediction block and a transform block, a pair of transform blocks or a pair of prediction blocks. Further as explained herein with reference to FIG. 2A, the prediction block and the transform block may represent basic units of prediction and transformation, respectively, as per one or more video coding paradigms including, for example, the H.264 coding paradigm, the HEVC paradigm, and the like. Each of the first block 212 and the second block 213 is a block of 16 pixels (for example, 4×4 pixels). For example, a bottom row 214 of first block 212 includes pixels 218, 220, 222 and 224 with associated pixel values p3, p2, p1, and p0 respectively. The bottom row 214 of block 213 includes pixels 226, 228, 230 and 232 with associated pixel values q0, q1, q2 and q3, respectively. It is noted that the pixel values p3, p2, p1, and p0 and q0, q1, q2, and q3 include information associated with chroma components and/or luma components of the video data. In an exemplary embodiment, both the horizontal and the vertical edges corresponding to the blocks of the video data are filtered. The vertical and horizontal edges are explained herein with reference to FIGS. 2C and 2D.

Figure 2C:
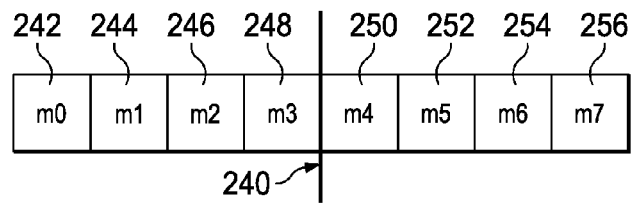
FIG. 2C depicts an exemplary vertical edge in accordance with an embodiment.
Figure 2D:
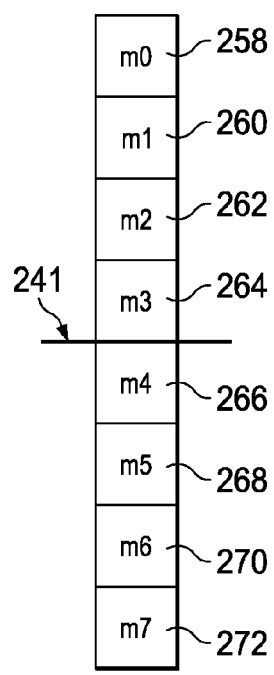
FIG. 2D depicts an exemplary horizontal edge in accordance with an embodiment.

FIGS. 2C and 2D depict an exemplary vertical edge 240 and an exemplary horizontal edge 241, respectively, in accordance with an embodiment. It is noted that a single row of pixels, such as, for example, the bottom row 214 of FIG. 2B, is depicted along the vertical and horizontal edges. However, it is further noted that the row of pixels corresponds to blocks of video data, such as, for example, the first block 212 and the second block 213 of FIG. 2B. In FIG. 2C, the vertical edge 240 serves as the boundary between a set of pixels 242, 244, 246 and 248 with associated pixel values m0, m1, m2, and m3, respectively, on the left side of the vertical edge 240 and a set of pixels 250, 252, 254 and 256 with associated pixel values m4, m5, m6, and m7, respectively, on the right side of the vertical edge 240. Similarly, in FIG. 2D, the horizontal edge 241 serves as the boundary between a set of pixels 258, 260, 262, and 264 with associated pixel values m0, m1, m2, and m3, respectively, above the horizontal edge 241 and a set of pixels 266, 268, 270, and 272 with associated pixel values m4, m5, m6, and m7, respectively, below the horizontal edge 241. In an embodiment, each of the vertical edge 240 and the horizontal edge 241 is a candidate for filtering during filtering of adjacent blocks associated with each edge.

With reference again to FIG. 2A, in one embodiment, the processing module 202 is operable to configure at least one filter coefficient corresponding to the chroma deblocking filter 210 based on one or more filter coefficients corresponding to the luma deblocking filter 208. In an embodiment, the processing module 202 is further configured to cause the chroma deblocking filter 210 to filter the edge between the adjacent blocks (for example, the edge 211 between adjacent blocks 212 and 213 of FIG. 2B) based on the configured at least one filter coefficient.

In an exemplary embodiment, a filter coefficient of the at least one filter coefficient corresponds to a parameter, and a parametric value associated with the parameter is configured to be combined with a pixel value corresponding to a pixel associated with a block of the adjacent blocks of video data. More specifically, the chroma deblocking filter 210 may include a parameter that at least partially corresponds to a difference in pixel values across the edge. The value of the parameter, which may also be referred to, for example, as the parametric value, may be added to the pixel values of pixels of the adjacent blocks in order to smooth the transition of content across the edge during display. The parameter and the parametric value are hereinafter referred to as 'delta' and 'delta value', respectively.

In an embodiment, the configuring of the at least one filter coefficient corresponding to the chroma deblocking filter 210 based on one or more filter coefficients corresponding to the luma deblocking filter leads to modification of coefficients configuring the delta associated with the chroma deblocking filter 210 with the corresponding change in the delta value as explained further along with equations (1) and (2).

In an embodiment, the one or more filter coefficients corresponding to the luma deblocking filter 208, based upon which the filter coefficients corresponding to the chroma deblocking filter 210 are configured, correspond to a filtering mode of the luma deblocking filter 208, wherein such filtering mode is associated with the modifying of fewer pixel values with regard to pixels associated with at least one of the adjacent blocks of video data as compared to one or more remaining filtering modes of the luma deblocking filter 208. As explained herein with reference to FIG. 1B, the filtering of luma components by a luma deblocking filter may include one or more filtering modes, such as, for example, strong filtering modes and weak filtering modes. The weak filtering modes for filtering luma components may be applied when a lower degree of pixel value variations is observed across edges corresponding to the video data. In such scenarios, a relatively small number of pixel values on either side of the edge are modified during the filtering of the edge. In one embodiment, the filter coefficients corresponding to the chroma deblocking filter 210 are configured based on one or more filter coefficients (for example, filter coefficients corresponding to delta) of luma deblocking filter 208 associated with the weak filtering mode.

As explained, the delta value of the deblocking filter determines an extent of modification of the pixels around the edge (for example, vertical edge 240 and horizontal edge 241 of FIGS. 2C and 2D) and is a function of a difference between the pixel values across the edge 241. For example, suppose that a delta value for a luma deblocking filter 208 is given by the following equation (1):

$$\text{delta}=\text{Clip3}(-tc,tc,((13*(m4-m3)+4*(m5-m2)-5*(m6-m1)+16)>>5)) \quad (1)$$

wherein tc is, for example, an eight bit constant value, and m2, m3, m4, m5 and m6 are pixel values associated with respective pixels (for example, pixels 242 to 256 or 258 to 272 of FIGS. 2C and 2D, respectively). The pixel values of equation (1) include luma components associated with the corresponding pixels in the adjacent blocks across the edge (for example, vertical edge 240 or horizontal edge 241).

The processing module 202 correspondingly configures a delta value for a chroma deblocking filter 210 as per equation (2) based on equation (1):

$$\text{delta}=\text{Clip3}(-tc,tc,((13*(m4-m3)-4*(m5-m2)+16)>>5)) \quad (2)$$

The chroma deblocking filter 210 that is configured based on equation (2) includes three filter coefficients (for example, 13/5, 4/5, and 16/5) that form a subset of a set of filter coefficients (for example, 13/5, 4/5, 5/5, and 16/5) corresponding to the luma deblocking filter 208 as illustrated in equation (1). The pixel values (for example, m2, m3, m4, and m5) of equation (2) include the chroma components associated with the corresponding pixels (for example, pixels 242 to 256 or 258 to 272 of FIGS. 2C and 2D, respectively) in the adjacent blocks across the edge (for example, vertical edge 240 or horizontal edge 241).

By configuring at least one filter coefficient for the chroma deblocking filter 210 based on one or more filter coefficients corresponding to the luma deblocking filter 208, the chroma deblocking filter 210 and the luma deblocking filter 208 thereby share a commonality and may be implemented using a shared logic/area in a hardware implementation.

In an embodiment, the processing module 202 is configured to compute a boundary strength associated with an edge based on whether the adjacent blocks correspond to one of inter-coded blocks of the video data and intra-coded blocks of the video data. A strength of the chroma deblocking filter 210 and the luma deblocking filter 208 may be determined dynamically based on quantization metrics, a type of coding of adjacent pixels in the vicinity of the edge, a gradient of the pixel values across the edge and/or the boundary strength associated with the edges. It is noted that the term "boundary strength" as used herein, may be construed, for example, as being indicative of a type of an edge, for example a macroblock edge or non-macroblock edge, an actual edge or an edge configured on account of quantization of transform coefficients, and is a numerical value computed based on an encoding mode of the adjacent blocks associated with the edge and encoding data associated with the adjacent blocks. The encoding mode may include an intra prediction mode or an inter prediction mode. The encoding data includes, but is not limited to, residual data, motion estimation data and data associated with one or more reference frames/pictures corresponding to the blocks. The boundary strength may also be computed based on pixel values in order to verify if one or more existing pixel differences along the edge are indicative of the presence of the blocking artifact. In an embodiment, the boundary strength may be computed based on a prediction boundary and/or a transform boundary. The prediction boundary is indicative of whether the adjacent blocks correspond to one of inter-coded blocks of the video data and whether at least one of the adjacent blocks corresponds to an intra-coded block of the video data. The transform boundary is indicative of various parameters, modes, and data associated with transformation stage during compression of the adjacent blocks.

In an embodiment, the boundary strength may be assigned numerical values ranging from 0 to 4. In an embodiment, a boundary strength of 4 may be associated with an edge with at least one of the adjacent blocks across the edge being intra-coded and the edge being a macro block edge. In an embodiment, a boundary strength of 3 may be associated with an edge with at least one of the adjacent blocks across the edge being intra-coded and the edge not being a macro block edge. In an embodiment, a boundary strength of 2 may be associated with an edge with neither of the adjacent blocks being intra-coded and at least one of the adjacent blocks containing coded coefficients. In an embodiment, a boundary strength of 1 may be associated with an edge with neither of the adjacent blocks being intra coded and neither of the adjacent blocks containing coded coefficients and the adjacent blocks having different reference frames, a different number of reference frames and/or different motion vectors. In an embodiment, a boundary strength of 0 may be associated with an edge with neither of the adjacent blocks being intra-coded, and neither of the adjacent blocks containing coded coefficients, wherein both of the adjacent blocks have or share a same reference frame and identical motion vectors. It is noted that though the numerical values assigned to boundary strength are explained herein with reference to the H.264 video coding paradigm, the boundary strength may similarly be assigned numerical values based on edges corresponding to coding units with reference to the HEVC paradigm.

In an embodiment, the deblocking module 204 applies a deblocking filter of maximum filtering strength to an edge associated with a boundary strength of 4 and skips the filtering of an edge with a boundary strength of 0. The filtering is maintained stronger at edges containing a significant amount of blocking distortion, such as, for example, an edge between adjacent intra-coded blocks and between adjacent blocks containing coded coefficients.

In an embodiment, the processing module 202 is configured to cause the chroma deblocking filter 210 to filter the edge (for example, edge 211) between the adjacent blocks corresponding to the video data based on the configured at least one filter coefficient for the chroma deblocking filter 210. In an embodiment, the chroma deblocking filter 210 filters the edge between the adjacent blocks based on the computed boundary strength. In an embodiment, the processing module 202 is configured to compare the computed boundary strength with a predetermined value. In an example embodiment, the predetermined value may be two units. It is noted that the predetermined value may be set to a value greater than or lesser than two. On determining that the boundary strength is greater than the predetermined value (for example, a boundary strength greater than two indicating that at least one of the adjacent blocks is intra-coded blocks) the chroma deblocking filter 210 filters the edge corresponding to the adjacent blocks of the video data (for example, by modifying pixel values, thereby modifying one or more chroma components associated with the pixels in the vicinity of the edge) based on the at least one filter coefficient. The foregoing notwithstanding, in one embodiment, On determining that boundary strength is less than or equal to the predetermined value (for example, indicative that the adjacent blocks correspond to inter-coded blocks) and that the boundary strength is a non-zero value, the processing module 202 determines whether the adjacent blocks corresponding to the edge are associated with blocking artifacts based on a pre-defined criterion. In an embodiment, the pre-defined criterion is at least partially configured based on a sum of absolute differences between pixel values corresponding to pixels associated with at least one of the adjacent blocks of the video data. For example, in an embodiment, the pre-defined criterion is Inter_Edge<(beta>>3)) && (abs(m3−m4)<((tc*5+1)>>1), wherein beta is a pre-defined threshold value and the parameter Inter Edge is given by the following equation (3):

$$\text{Inter\_Edge} = abs(m0-m3) + abs(m7-m4) \quad (3)$$

If the parameter Inter_Edge satisfies the pre-defined criterion, it is concluded that the adjacent blocks are associated with blocking artifacts, and the edge is subjected to filtering based on the at least one configured filter coefficient of the chroma deblocking filter 210. The chroma deblocking filter 210 filters the edge based on the at least one configured filter coefficient (for example, by modifying one or more pixel values, thereby modifying one or more chroma components associated with the pixels in the vicinity of the edge) upon the edge satisfying the pre-defined criterion.

In an embodiment, the deblocking module 204 performs the filtering along the line of pixels upon a difference between two or more unfiltered pixel values of adjacent pixels across the edge being less than alpha (for example, (p0−q0)<alpha) and a difference between two or more pixel values of adjacent pixels on each side (for example, left side and right side for a vertical edge or above and below a horizontal edge) of the edge being less than beta (for example, (p1−p0)<beta and (q1−q0)<beta), wherein alpha and beta are thresholds that are determined based on an average quantization parameter over the edge associated with an encoder, and p0, q0, p1, and q1 denote corresponding pixel values associated with the pixels illustrated in FIG. 2B. The filtering of the edge based on pixel values is further explained herein with reference to FIG. 2E.

Figure 2E:
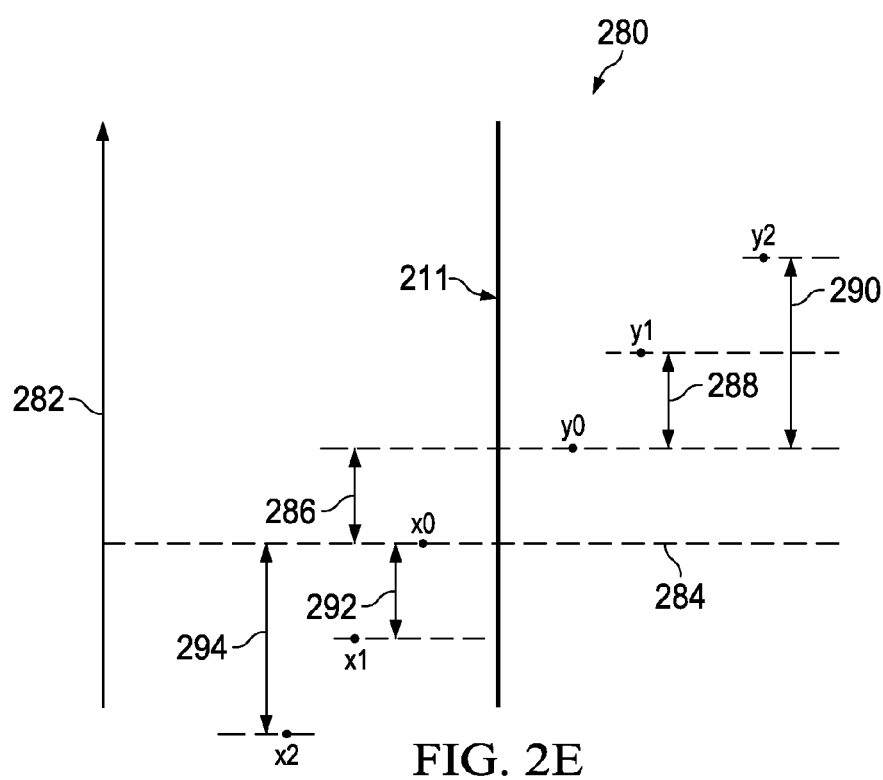
FIG. 2E illustrates an exemplary plot of pixel values against pixel locations relative to an edge, which is applicable to filtering of the edge, in accordance with an embodiment.

FIG. 2E illustrates an exemplary plot 280 of pixel values against pixel locations relative to the edge 211, which is applicable to the filtering of the edge 211, in accordance with an embodiment. In FIG. 2E, the Y-axis 282 corresponds to pixel values (for example, luma components or chroma components) and the X-axis 284 corresponds to pixel locations relative to the edge 211. The points x0, x1, x2, y0, y1, and y2 in the plot 280 correspond to the pixel locations p0, p1, p2, q0, q1 and q2 respectively of row 214 of FIG. 2B. In an embodiment, filtering of the edge 211 is performed if a pixel value difference 286 between pixel values x0 and y0 corresponding to pixel locations p0 and q0 respectively is less than alpha and pixel value differences 288, 290, 292, and 294 between y0 and y1, y0 and y2, x0 and x1, x0 and x2, respectively, are less than beta. The thresholds alpha and beta enable a distinguishing feature to exist between the actual edges in the video data and edges created due to quantization of transform-coefficients. The actual edges are left unfiltered while the edges created due to quantization of transform coefficients are filtered. In an embodiment, the thresholds alpha and beta are indicative of an activity along the line (for example, row 214) of the pixels. Upon the activity exceeding the threshold, the pixel values are not modified and the filtering is skipped.

The foregoing notwithstanding, in one embodiment, the filtering may be continued if the activity exceeds the threshold value. In an embodiment, upon applying the chroma deblocking filter 210 on the edge 211, a set of three pixel values (for example, at pixel locations p0, p1, and p2 and/or at pixel locations q0, q1, and q2) on either side of the edge 211 are modified (for example, pixel values are altered in order to smooth the transition of pixel value differences across the edge).

In an embodiment, the system 200 additionally includes other components, such as, for example, an input unit (for example, a video processing device), a video display unit (for example, liquid crystals display (LCD), a cathode ray tube (CRT), and the like), a cursor control device (for example, a mouse), a drive unit (for example, a disk drive), a signal generation unit (for example, a speaker) and/or a network interface unit. The input unit is operable to transfer the video data to the processing module 202 and the deblocking module 204 for the processing of the video data. The drive unit includes a machine-readable medium upon which is stored one or more sets of instructions (for example, software) embodying one or more of the methodologies and/or functions described herein. In an embodiment, the software resides, either completely or partially, within the processing module 202 and/or the deblocking module 204 during the execution thereof by the system 200 such that processing module 202 and/or the deblocking module 204 also constitute machine-readable media.

The software may further be transmitted and/or received over a network via the network interface unit. The term "machine-readable medium" may be construed as including a single medium and/or multiple media (for example, a centralized and/or distributed database, and/or associated caches and servers) that store the one or more sets of instructions. Moreover, the term "machine-readable medium" may be construed to include any medium that is capable of storing, encoding and/or carrying a set of instructions for execution by the system 200 and that cause the system 200 to perform one or more of the methodologies of the various embodiments. Furthermore, the term "machine-readable medium" may be construed to include, but shall not be limited to, solid-state memories, optical and magnetic media, and carrier wave signals. A method for reducing blocking artifacts in video data is described herein with reference to FIG. 3.

FIG. 3 is a flow diagram of a method 300 for reducing blocking artifacts in video data in accordance with an embodiment. In an embodiment, the method 300 may be computer-implemented. In an embodiment, the system 200 of FIG. 2A may employ the method 300 for reducing blocking artifacts in video data. The method 300 starts at operation 302. At operation 302, at least one filter coefficient corresponding to a chroma deblocking filter (for example, chroma deblocking filter 210 of FIG. 2A) is configured (for example, using processing module 202 of FIG. 2A) based on one or more filter coefficients corresponding to a luma deblocking filter (for example, luma deblocking filter 208 of FIG. 2A). The filter coefficient of the at least one filter coefficient may correspond to a parameter (for example, parameter 'delta' explained in FIG. 2A), and a parametric value (for example, parameter 'delta value' explained in FIG. 2A) associated with the parameter is configured to be combined with a pixel value corresponding to a pixel associated with a block of adjacent blocks of video data. In an example embodiment, a block of the adjacent blocks corresponds to one of a prediction block and a transform block. The edge may be formed by a boundary between a prediction block and a transform block, between a pair of adjacent prediction blocks or between a pair of adjacent transform blocks. In an embodiment, the prediction blocks may include 16*16 blocks associated with video data and the transform blocks may include 32*32 blocks associated with video data. It is noted that the prediction block and the transform block may be basic units of prediction and transformation, respectively, as per one or more video coding paradigms including, for example, a H.264 coding paradigm, a HEVC paradigm, and the like. For example, the prediction blocks may include prediction units and the transform blocks may include transform units, where the prediction units and the transform units defined as per the HEVC paradigm.

In an embodiment, the prediction units and the transform units may be a part of a coding unit of the HEVC paradigm. It is noted that the term 'coding unit' may be construed as referring to a basic unit of compression in the HEVC paradigm and is broadly analogous to the concept of macro block in the H.264 coding paradigm but is comparatively more flexible in terms of variable size. In the HEVC paradigm, the size of the coding units may be of the order of, for example, 32×32, or 64×64. Each coding unit may include multiple prediction units and/or transform units. A transform unit may include one or more prediction units. Alternatively, a prediction unit may include one or more transform units. In addition to 4×4 and 8×8 transforms 16×16, 32×32, 32×16, 16×32, 16×8 and 8×16 transforms may be supported by transform units of the HEVC paradigm.

The parameter associated with the filter coefficient may at least partially correspond to a difference in pixel values across the edge. The value of the parameter, which may also be referred to as, for example, the parametric value, may be added to the pixel values of pixels of the adjacent blocks in order to smooth the transition of content across the edge during display. In an embodiment, the luma deblocking filter may correspond to a deblocking filter associated with a filtering mode configured to filter luma components corresponding to the edge. The filtering mode may include a strong filtering mode or a weak filtering mode, as explained in FIG. 1B. In an embodiment, the one or more filter coefficients may correspond to the weak filtering mode of the luma deblocking filter. The filter coefficient of the chroma deblocking filter may be configured based on one or more filter coefficients corresponding to the luma deblocking filter as explained herein with reference to FIG. 2A. For example, suppose that a delta value for a luma deblocking filter is given by the following equation (4):

$$\text{delta}=\text{Clip3}(-tc,tc,((13*(m4-m3)+4*(m5-m2)-5*(m6-m1)+16)>>5)) \quad (4)$$

wherein tc is, for example, an eight bit constant value, and m2, m3, m4, m5 and m6 are pixel values associated with respective pixels (for example, pixels 242 to 256 or 258 to 272 of FIGS. 2C and 2D, respectively). The pixel values of equation (4) include luma components associated with the corresponding pixels in the adjacent blocks across the edge (for example, vertical edge 240 or horizontal edge 241).

A delta value for a chroma deblocking filter may be configured as per equation (4) based on equation (5):

$$\text{delta}=\text{Clip3}(-tc,tc,((13*(m4-m3)-4*(m5-m2)+16)>>5)) \quad (5)$$

The chroma deblocking filter that is configured based on equation (5) includes three filter coefficients (for example, 13/5, 4/5, and 16/5) that form a subset of a set of filter coefficients (for example, 13/5, 4/5, 5/5, and 16/5) corresponding to the luma deblocking filter 208 as illustrated in equation (4). The pixel values (for example, m2, m3, m4, and m5) of equation (5) include the chroma components associated with the corresponding pixels (for example, pixels 242 to 256 or 258 to 272 of FIGS. 2C and 2D, respectively) in the adjacent blocks across the edge (for example, vertical edge 240 or horizontal edge 241).

By configuring at least one filter coefficient for the chroma deblocking filter based on one or more filter coefficients corresponding to the luma deblocking filter, the chroma deblocking filter and the luma deblocking filter thereby share a commonality and may be implemented using a shared logic/area in a hardware implementation.

In an embodiment, a boundary strength associated with the edge is computed (for example, using processing module 202 of FIG. 2A). It is noted that the term "boundary strength", as used herein, may be construed, for example, as being indicative of a type of an edge, for example a macroblock edge or non-macroblock edge, an actual edge or an edge configured on account of quantization of transform coefficients, and is a numerical value computed based on an encoding mode of the adjacent blocks associated with the edge and encoding data associated with the adjacent blocks. The encoding mode may include an intra prediction mode or an inter prediction mode. The encoding data includes, but is not limited to, residual data, motion estimation data and data associated with one or more reference frames/pictures corresponding to the blocks. The boundary strength may also be computed based on pixel values in order to verify if one or more existing pixel differences along the edge are indicative of the presence of the blocking artifact. In an embodiment, the boundary strength is determined based on a prediction boundary and/or a transform boundary. The prediction boundary is indicative of whether the adjacent blocks correspond to one of inter-coded blocks of the video data and whether at least one of the adjacent blocks corresponds to an intra-coded block of the video data. The transform boundary is indicative of various parameters, modes, and data associated with transformation stage during compression of the adjacent blocks.

In an embodiment, at operation 304, an edge between adjacent blocks associated with video data is filtered (for example using the chroma deblocking filter 210 of FIG. 2A) based on the configured filter coefficients for the chroma deblocking filter, where a block of the adjacent blocks corresponds to one of a prediction block and a transform block. In an example embodiment, the edge is filtered by the chroma deblocking filter based on the computed boundary strength. For example, the computed boundary strength is compared (for example, using processing module 202 of FIG. 2A) with a predetermined value, for example a value of 2. On determining that the boundary strength is greater than the predetermined value the edge is filtered by the chroma deblocking filter based on the configured at least one filter coefficient. In an embodiment, on determining that the boundary strength to be less than or equal to the predetermined value, it is determined (for example, using processing module 202 of FIG. 2A) whether the adjacent blocks corresponding to the edge are associated with blocking artifacts based on a pre-defined criterion. In an embodiment, the pre-defined criterion may be at least partially configured based on the sum of absolute differences between pixel values corresponding to pixels associated with at least one of the adjacent blocks of video data. For example, in an embodiment, the pre-defined criterion is Inter_Edge<(beta>>3)) && (abs(m3−m4)<((tc*5+1)>>1), wherein beta is a pre-defined threshold value and the parameter Inter_Edge is given by the following equation (6):

$$\text{Inter\_Edge} = abs(m0-m3) + abs(m7-m4) \quad (6)$$

If the parameter Inter_Edge satisfies the pre-defined criterion, it is concluded that the adjacent blocks are associated with blocking artifacts, and the edge is subjected to filtering based on the at least one configured filter coefficient of the chroma deblocking filter. The chroma deblocking filter filters the edge based on the at least one configured filter coefficient (for example, by modifying one or more pixel values, thereby modifying one or more chroma components associated with the pixels in the vicinity of the edge) upon the edge satisfying the pre-defined criterion. Upon the edge satisfying the pre-defined criterion that is indicative of the presence of the blocking artifact, the edge is filtered by the chroma deblocking filter based on the configured at least one filter coefficient. A method for filtering the edge is explained further herein with reference to FIGS. 4A-4B.

Figure 4B:
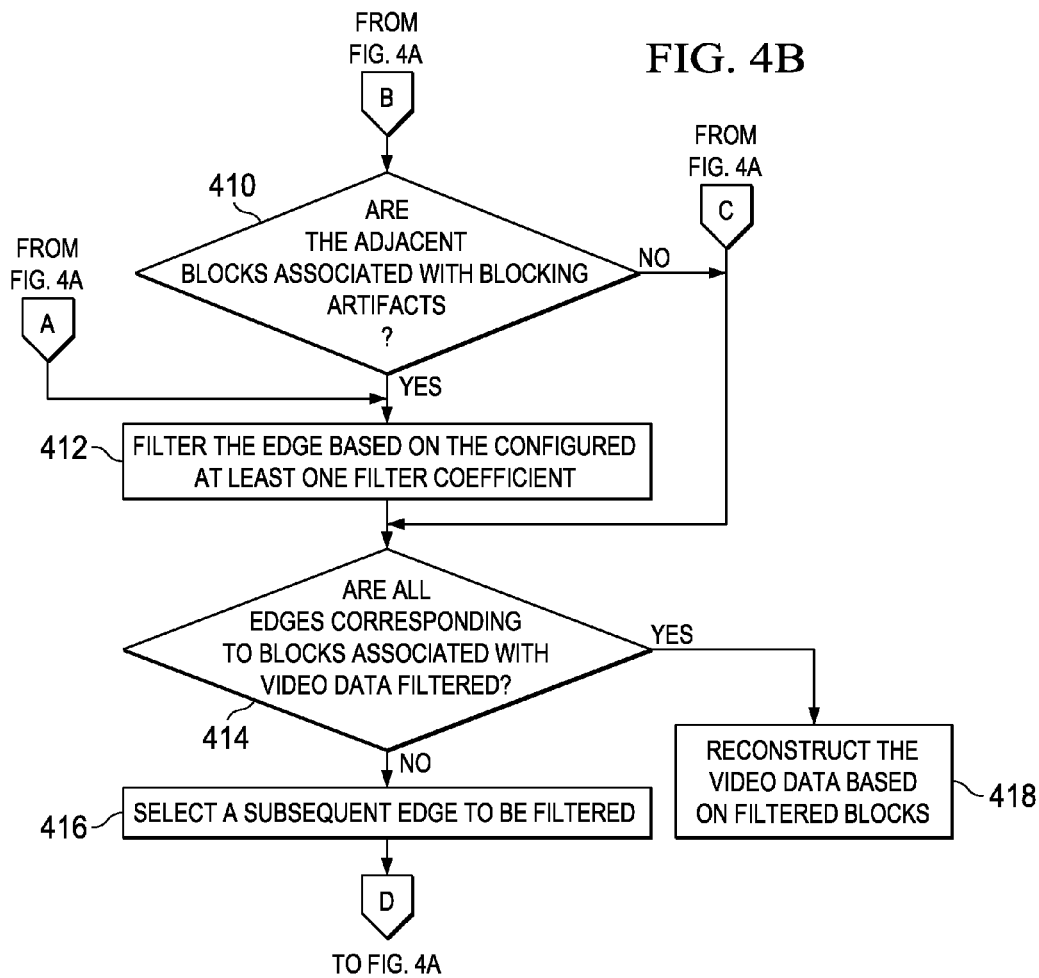

FIGS. 4A-4B collectively show a flow diagram of an exemplary method 400 for reducing blocking artifacts in video data by filtering an edge between adjacent blocks associated with video data in accordance with an embodiment. The method 400 starts at operation 402. At operation 402, at least one filter coefficient corresponding to a chroma deblocking filter (for example, chroma deblocking filter 210 of FIG. 2A) is configured (for example, using processing module 202 of FIG. 2A) based on one or more filter coefficients corresponding to a luma deblocking filter (for example, luma deblocking filter 208 of FIG. 2A). The filter coefficient of the chroma deblocking filter is configured as explained herein with reference to FIG. 2A. The configuring of the at least one coefficient of the chroma deblocking filter based on one or more filter coefficients corresponding to a luma deblocking filter creates a commonality between the chroma deblocking filter and the luma deblocking filter.

In an embodiment, the luma deblocking filter may correspond to a deblocking filter associated with a weak filtering mode for filtering luma components corresponding to the edge. The filter coefficient of the at least one filter coefficient corresponds to a parameter, and a parametric value associated with the parameter is configured to be combined with a pixel value corresponding to a pixel associated with a block of the adjacent blocks of video data. The adjacent blocks and the edge between the adjacent blocks may be substantially similar to the adjacent blocks and the edge described in FIG. 3. More specifically, the parameter may at least partially correspond to a difference in pixel values across the edge. The value of the parameter, which may also be referred to, for example, as the parametric value, may be added to the pixel values of pixels of the adjacent blocks in order to smooth the transition of content across the edge during display.

At operation 404, a boundary strength associated with an edge between adjacent blocks associated with video data is computed (for example, using processing module 202 of FIG. 2A). In an embodiment, a block of the adjacent blocks corresponds to one of a prediction block and a transform block (for example, corresponding to adjacent blocks as explained herein with reference to FIG. 2A). In an embodiment, the boundary strength may be a numerical value computed based on an encoding mode of the adjacent blocks associated with the edge and encoding data associated with the adjacent blocks and configured to provide insight regarding the edge associated with the adjacent blocks. The encoding mode may include an intra prediction mode or an inter prediction mode. The encoding data includes, but is not limited to, residual data, motion estimation data and data associated with one or more reference frames/pictures corresponding to the blocks. The boundary strength may also be computed based on pixel values in order to verify whether one or more existing pixel differences along the edge are indicative of the presence of the blocking artifact. In an embodiment, the boundary strength is computed based on a prediction boundary and/or a transform boundary. The prediction boundary is indicative of whether the adjacent blocks correspond to one of inter-coded blocks of video data and intra-coded blocks of video data. The transform boundary is indicative of various parameters, modes, and data associated with transformation stage during compression of adjacent blocks.

At operation 406, it is checked (for example, using processing module 202 of FIG. 2A) whether the value of boundary strength is greater than 2. In an embodiment, boundary strength of value greater than 2 indicates that at least one of the adjacent blocks correspond to an intra-coded block of the video data. If the value of the boundary strength is less than or equal to 2, then at operation 408 it is checked (for example, using processing module 202 of FIG. 2A) whether the boundary strength is a non-zero value. In an embodiment, a non-zero value of boundary strength and a value less than or equal to 2 indicates that the adjacent blocks correspond to inter-coded blocks of the video data. If the boundary strength is a non-zero value, then at operation 410, it is determined (for example, using processing module 202 of FIG. 2A) whether the adjacent blocks are associated with blocking artifacts. In an embodiment, the determination of whether the adjacent blocks are associated with blocking artifacts is performed based on a pre-defined criterion.

In an embodiment, the pre-defined criterion may be at least partially configured based on the sum of absolute differences between pixel values corresponding to pixels associated with at least one of the adjacent blocks of video data. The pre-defined criterion may be configured as described herein with reference to FIG. 2A. Upon the edge satisfying the pre-defined criterion (which is indicative of the presence of the blocking artifacts) the edge is subsequently subjected to filtering using the chroma deblocking filter based on the configured at least one filter coefficient at operation 412. If it is determined that the value of the boundary strength is greater than 2, then operation 412 is performed.

If it is determined that the boundary strength is zero value at operation 408, then method 400 skips to operation 414. The operation 414 is also performed upon filtering the edge at operation 412 and upon determining that the adjacent blocks are not associated with blocking artifacts at operation 410. At operation 414, it is checked (for example, using processing module 202 of FIG. 2A) if all edges corresponding to blocks associated with video data are filtered. If it determined that all the edges are not filtered, then at operation 416, a subsequent edge for filtering is selected and operations 404-414 are repeated till all the edges corresponding to the blocks associated with video data are filtered. If all the edges corresponding to the blocks associated with video data are filtered, then at operation 418, the video data is reconstructed based on filtered blocks.

Figure 5:
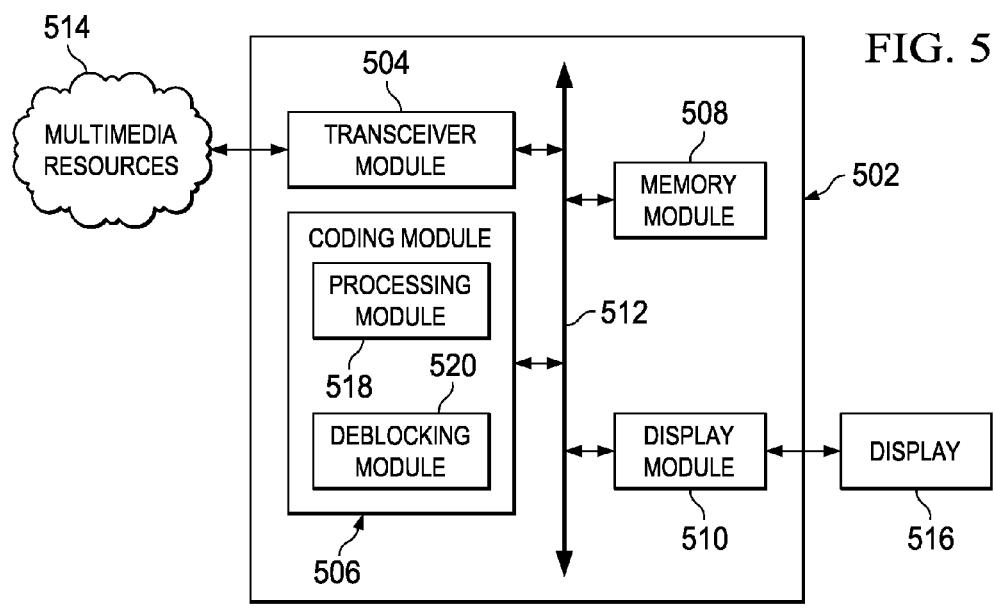
FIG. 5 is a block diagram of an exemplary integrated circuit configured to reduce blocking artifacts in video data in accordance with an embodiment.

FIG. 5 is a block diagram of an integrated circuit 502 configured to reduce blocking artifacts in video data in accordance with an embodiment. The integrated circuit 502 comprises a transceiver module 504, a coding module 506, a memory module 508 and a display module 510. The transceiver module 504, the coding module 506, the memory module 508 and the display module 508 are communicatively associated or coupled with each other using data path 512. As such, it should be appreciated that at least some of the components described below in connection with the integrated circuit 502 may be optional and thus in an example embodiment the integrated circuit 502 may include more, less or different components than those described in connection with the example embodiment of FIG. 5. In an embodiment, the integrated circuit 502 may include the coding module 506 and the memory module 508 only.

The transceiver module 504 is communicatively associated or coupled with a plurality of multimedia resources 514 and is configured to receive video data from one or more multimedia resources from among the plurality of multimedia resources 514. Examples of the multimedia resources may include, but are not limited to (1) remote multimedia systems (2) media capture devices, such as, for example, a camera, camcorders and the like, and (3) multimedia storage devices, such as, for example, magnetic tapes, disks, computer-readable media and the like. In an embodiment, the transceiver module 504 may include an antenna and/or network connectors configured to coupled with or connect to wired networks (for example, local area networks (LANs)) and wireless networks (for example, cellular networks), or a combination thereof (for example, the Internet). Examples of network connectors may include a universal serial bus (USB) interface, a wireless LAN interface, an infrared interface, an Ethernet port and the like.

The coding module 506 is configured to perform at least one of encoding of video data and decoding of encoded video data. In an embodiment, the transceiver module 504 may be configured to receive the video data in encoded form and provide the encoded video data to the coding module 506. The coding module 506 may be configured to decode the encoded video data and provide the decoded video data to the memory module 508 for storage or to the display module 510 for displaying the video data on a display 516. In an embodiment, the coding module 506 may be configured to encode the video data and provide the video data to transceiver module 504 for transmission purposes or to memory module 508 for storage purposes. In an embodiment, the coding module 506 may be configured to include components such as the processing module 518 and the deblocking module 520, which may be substantially similar to processing module 202 and the deblocking module 204, respectively, of system 200 of FIG. 2A. The deblocking module 520 includes a luma deblocking filter, which may be substantially similar to the luma deblocking filter 208 of FIG. 2A, and a chroma deblocking filter, which may be substantially similar to the chroma deblocking filter 210 of FIG. 2A. The components within the coding module 506 are configured to perform functions as discussed in FIG. 2A, which are not repeated herein for the sake of brevity.

The memory module 508 is configured to store the video data subsequent to one of encoding of video data and decoding of video data. Examples of memory module 508 may include, but are not limited to, random access memory (RAM), dual port RAM, synchronous dynamic RAM (SDRAM), double data rate SDRAM (DDR SDRAM), and the like. The display module 510 is configured to facilitate a display of the video data on display 516. The display 516 may be facilitated, for example, in response to a user input received using a user interface (not shown in FIG. 5). Examples of display 516 may include a light crystal display (LCD) panel, a plasma display panel, a field emission display and the like.

In an embodiment the integrated circuit 502 may be an application processor chip. In an embodiment, the integrated circuit 502 may be a part of a particular or shared processor chip that is embedded within a multimedia system. Examples of the multimedia systems may include, but are not limited to, (1) multimedia devices, such as, for example, cellular phones, digital video cameras and digital camcorders; (2) data processing devices, such as, for example, personal computers, laptops and personal digital assistants; and (3) consumer electronics, such as, for example, set top boxes, digital video disk (DVD) players and video network servers.

Without in any way limiting the scope, interpretation, or application of the claims appearing below, advantages of one or more of the exemplary embodiments disclosed herein include an increase in a precision associated with the chroma deblocking filter due to a reduction in the quantization of one or more filter coefficients. The precision is increased by, for example, 2 bits. The increase in the precision leads to more accurate filter coefficients and thereby improves filter quality. Additionally, a configuration of the filter coefficients of the chroma deblocking filter based on the luma deblocking filter enables the inclusion of separate logic/hardware to be avoided for the implementation of each deblocking filter, thereby leading to a sizable hardware/logic savings. Moreover, various methods, systems and integrated circuits of the present technology enable the application of the chroma deblocking filter to edges between adjacent inter-coded blocks, thereby resulting in an improvement in a perceptual quality of the video data. Also, various embodiments of the present technology are capable of causing the chroma deblocking filter to be more efficient with regard to a peak signal to noise ratio (for example, in terms of improvement in video quality).

Although the present technology has been described with reference to specific exemplary embodiments, it is noted that various modifications and changes may be made to these embodiments without departing from the broad spirit and scope of the present technology. For example, the various devices, modules, analyzers, generators, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the various electrical structures and methods may be embodied using transistors, logic gates, and electrical circuits (for example, application specific integrated circuit (ASIC) circuitry and/or in Digital Signal Processor (DSP) circuitry).

Particularly, the system 200, the processing module 202 and the deblocking module 204 may be enabled using software and/or using transistors, logic gates, and electrical circuits (for example, integrated circuit circuitry such as ASIC circuitry). Various embodiments of the present disclosure may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. Additionally, a tangible data storage device may be embodied as one or more volatile memory devices, one or more non-volatile memory devices, and/or a combination of one or more volatile memory devices and non-volatile memory devices.

Also, techniques, devices, subsystems and methods described and illustrated in the various embodiments as discrete or separate may be combined or integrated with other systems, modules, techniques, or methods without departing from the scope of the present technology. Other items shown or discussed as directly coupled or communicating with each other may be coupled through some interface or device, such that the items may no longer be considered directly coupled with each other but may still be indirectly coupled and in communication, whether electrically, mechanically, or otherwise, with one another. Other examples of changes, substitutions, and alterations ascertainable by one skilled in the art, upon or subsequent to studying the exemplary embodiments disclosed herein, may be made without departing from the spirit and scope of the present technology.

It should be noted that reference throughout this specification to features, advantages, or similar language does not imply that all of the features and advantages should be or are in any single embodiment. Rather, language referring to the features and advantages may be understood to mean that a specific feature, advantage, or characteristic described in connection with an embodiment may be included in at least one embodiment of the present technology. Thus, discussions of the features and advantages, and similar language, throughout this specification may, but do not necessarily, refer to the same embodiment.

Various embodiments of the present disclosure, as discussed above, may be practiced with steps and/or operations in a different order, and/or with hardware elements in configurations which are different than those which are disclosed. Therefore, although the technology has been described based upon these exemplary embodiments, it is noted that certain modifications, variations, and alternative constructions may be apparent and well within the spirit and scope of the technology. Although various exemplary embodiments of the present technology are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A system for reducing blocking artifacts, the system comprising:
a deblocking module comprising a luma deblocking filter and a chroma deblocking filter configured to filter an edge between adjacent blocks associated with video data, wherein a block of the adjacent blocks corresponds to one of a prediction block and a transform block and wherein the edge is filtered by the chroma deblocking filter based on the at least one filter coefficient on determining the adjacent blocks to be associated with the blocking artifacts and the boundary strength to be non-zero value; and
a processing module communicatively associated with the deblocking module, the processing module operable to configure at least one filter coefficient corresponding to the chroma deblocking filter based on one or more filter coefficients corresponding to the luma deblocking filter, and the processing module being configured to cause the chroma deblocking filter to filter the edge based on the at least one filter coefficient, wherein the one or more filter coefficients correspond to a filtering mode of the luma deblocking filter associated with modifying fewer pixel values of pixels associated with at least one of the adjacent blocks as compared to one or more remaining filtering modes of the luma deblocking filter.

2. The system of claim 1, wherein the processing module is further configured to:
compute a boundary strength associated with the edge, wherein the boundary strength is a numerical value computed based on at least one of an encoding mode of the adjacent blocks associated with the edge and an encoding data associated with the adjacent blocks.

3. The system of claim 2, where the edge is filtered by the chroma deblocking filter based on the at least one filter coefficient on determining the boundary strength to be greater than a predetermined value.

4. The system of claim 2, wherein the processing module is further configured to:
determine whether the adjacent blocks are associated with blocking artifacts based on a pre-defined criterion on determining the boundary strength to be less than or equal to a predetermined value.

5. The system of claim 4, wherein the pre-defined criterion is at least partially configured based on a sum of absolute differences between pixel values corresponding to pixels associated with at least one of the adjacent blocks.

6. The system of claim 1, wherein a filter coefficient of the at least one filter coefficient corresponds to a coefficient associated with a parameter, and wherein a parametric value associated with the parameter is configured to be combined with a pixel value corresponding to a pixel associated with a block from among the adjacent blocks.

7. The system of claim 1, wherein the system is one of a high efficiency video coding (HEVC) based decoder, a moving picture experts group (MPEG)-4 based decoder, a HEVC based encoder and a MPEG-4 based encoder.

8. A method executed by a processor of reducing blocking artifacts, the method comprising:
configuring at least one filter coefficient corresponding to a chroma deblocking filter based on one or more filter coefficients corresponding to a luma deblocking filter, wherein the one or more filter coefficients correspond to a filtering mode of the luma deblocking filter associated with modifying fewer pixel values of pixels associated with at least one of the adjacent blocks as compared to one or more remaining filtering modes of the luma deblocking filter; and
filtering an edge between adjacent blocks associated with video data based on the configured at least one filter coefficient to produce a video with reduced blocking artifacts, wherein a block of the adjacent blocks corresponds to one of a prediction block and a transform block and wherein the edge is filtered by the chroma deblocking filter based on the at least one filter coefficient on determining the adjacent blocks to be associated with the blocking artifacts and the boundary strength to be non-zero value.

9. The method of claim 8, further comprising:
computing a boundary strength associated with the edge, wherein the boundary strength is a numerical value computed based on at least one of an encoding mode of the adjacent blocks associated with the edge and an encoding data associated with the adjacent blocks.

10. The method of claim 9, where the edge is filtered by the chroma deblocking filter based on the at least one filter coefficient on determining the boundary strength to be greater than a predetermined value.

11. The method of claim 9, further comprising:
determining whether the adjacent blocks are associated with blocking artifacts based on a pre-defined criterion on determining the boundary strength to be less than or equal to a predetermined value.

12. The method of claim 11, wherein the pre-defined criterion is at least partially configured based on a sum of absolute differences between pixel values corresponding to pixels associated with at least one of the adjacent blocks.

13. The method of claim 8, wherein a filter coefficient of the at least one filter coefficient corresponds to a parameter, and wherein a parametric value associated with the parameter is configured to be combined with a pixel value corresponding to a pixel associated with a block from among the adjacent blocks.

14. An integrated circuit configured to reduce blocking artifacts, the integrated circuit comprising:
 a coding module configured to perform at least one of encoding of video data and decoding of encoded video data, the coding module comprising:
 a deblocking module comprising a luma deblocking filter and a chroma deblocking filter configured to filter an edge between adjacent blocks associated with video data, wherein a block of the adjacent blocks corresponds to one of a prediction block and a transform block; and
 a processing module communicatively associated with the deblocking module, the processing module operable to configure at least one filter coefficient corresponding to the chroma deblocking filter based on one or more filter coefficients corresponding to the luma deblocking filter, and the processing module being configured to cause the chroma deblocking filter to filter the edge based on the at least one filter coefficient and wherein the edge is filtered by the chroma deblocking filter based on the at least one filter coefficient on determining the adjacent blocks to be associated with the blocking artifacts and the boundary strength to be non-zero value and wherein the one or more filter coefficients correspond to a filtering mode of the luma deblocking filter associated with modifying fewer pixel values of pixels associated with at least one of the adjacent blocks as compared to one or more remaining filtering modes of the luma deblocking filter; and
 a memory module communicatively associated with the coding module, the memory module configured to store the video data subsequent to one of an encoding of the video data and a decoding of the video data.

15. The integrated circuit of claim 14, wherein a filter coefficient of the at least one filter coefficient corresponds to a coefficient associated with a parameter, and wherein a parametric value associated with the parameter is configured to be combined with a pixel value corresponding to a pixel associated with a block from among the adjacent blocks.

16. The integrated circuit of claim 14, wherein the edge is filtered by the chroma deblocking filter based on the at least one filter coefficient on determining a boundary strength to be greater than a predetermined value, wherein the boundary strength is a numerical value computed based on at least one of an encoding mode of the adjacent blocks associated with the edge and an encoding data associated with the adjacent blocks.

17. The integrated circuit of claim 14, wherein the processing module is further configured to:
 compute a boundary strength associated with the edge, wherein the boundary strength is a numerical value computed based on at least one of an encoding mode of the adjacent blocks associated with the edge and an encoding data associated with the adjacent blocks; and
 determine whether the adjacent blocks are associated with blocking artifacts based on a pre-defined criterion on determining the boundary strength to be less than or equal to a predetermined value, wherein the edge is filtered by the chroma deblocking filter based on the at least one filter coefficient on determining the adjacent blocks to be associated with the blocking artifacts and the boundary strength to be non-zero value.

\* \* \* \* \*